(12) United States Patent
Sturges et al.

(10) Patent No.: US 8,069,352 B2
(45) Date of Patent: Nov. 29, 2011

(54) DEVICE, SYSTEM AND METHOD FOR TIMESTAMP ANALYSIS OF SEGMENTS IN A TRANSMISSION CONTROL PROTOCOL (TCP) SESSION

(75) Inventors: Steven Sturges, Ellicott City, MD (US); Judy Hollis Novak, Marriotsville, MD (US)

(73) Assignee: Sourcefire, Inc., Columbia, MD (US)

( * ) Notice: Subject to any disclaimer, the term of this patent is extended or adjusted under 35 U.S.C. 154(b) by 1077 days.

(21) Appl. No.: 11/711,876

(22) Filed: Feb. 28, 2007

(65) Prior Publication Data

US 2008/0209518 A1  Aug. 28, 2008

(51) Int. Cl.
*H04L 9/32* (2006.01)
(52) U.S. Cl. .......................... 713/178; 726/3
(58) Field of Classification Search ............... 726/3, 22, 726/23, 24, 25, 26; 713/178, 188; 380/35, 380/36, 218
See application file for complete search history.

(56) References Cited

U.S. PATENT DOCUMENTS

| | | |
|---|---|---|
| 4,550,436 A | 10/1985 | Freeman |
| 4,570,157 A | 2/1986 | Kodaira |
| 4,857,912 A | 8/1989 | Everett et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A | 6/1993 | Lewis et al. |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,495,409 A | 2/1996 | Kanno |
| 5,497,463 A | 3/1996 | Stein et al. |
| 5,604,910 A | 2/1997 | Kojima et al. |
| 5,666,293 A | 9/1997 | Metz et al. |
| 5,796,942 A | 8/1998 | Esbensen |
| 5,870,554 A | 2/1999 | Grossman et al. |
| 5,901,307 A | 5/1999 | Potter et al. .................. 712/240 |

(Continued)

FOREIGN PATENT DOCUMENTS

GB    2 432 933 A    6/2007

(Continued)

OTHER PUBLICATIONS

Network Working Group Request for Comments: 1323 Obsoletes: RFC 1072, RFC 1185 V. Jacobson LBL, R. Braden ISI, D. Borman Cray Reseach May 1992.*

(Continued)

*Primary Examiner* — Beemnet Dada
*Assistant Examiner* — Sayed Beheshti Shirazi
(74) *Attorney, Agent, or Firm* — Posz Law Group, PLC

(57) ABSTRACT

A method performed in an intrusion detection/prevention system, a system or a device for determining whether a transmission control protocol (TCP) segment in a TCP connection in a communication network is acceptable. The TCP connection can include TCP segments beginning with a three way handshake. A TCP segment can include a field for a timestamp. A timestamp policy of plural timestamp policies is identified, the timestamp policy corresponding to a target associated with the segments in a TCP connection. A baseline timestamp is identified based on a three way handshake in the TCP connection. Segments in the TCP connection are monitored. The segments in the TCP connection are filtered as indicated in the timestamp policy corresponding to the target, the timestamp policy indicating whether the segments are to be filtered out or forwarded to the target by comparing the timestamp of the segments to the baseline timestamp.

12 Claims, 6 Drawing Sheets

U.S. PATENT DOCUMENTS

| | | | |
|---|---|---|---|
| 5,917,821 A | 6/1999 | Gobuyan et al. | |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,320,848 B1 | 11/2001 | Edwards et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1 | 7/2002 | Gleichauf et al. | |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 | 3/2003 | Prasad et al. | |
| 6,546,493 B1 | 4/2003 | Magdych et al. | |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,684,332 B1 * | 1/2004 | Douglas | 713/168 |
| 6,711,127 B1 | 3/2004 | Gorman et al. | |
| 6,754,826 B1 | 6/2004 | Challener et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,816,973 B1 | 11/2004 | Gleichauf et al. | |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,993,706 B2 | 1/2006 | Cook | |
| 6,999,998 B2 | 2/2006 | Russell | |
| 7,032,114 B1 | 4/2006 | Moran | 713/187 |
| 7,054,930 B1 | 5/2006 | Cheriton | |
| 7,058,821 B1 | 6/2006 | Parekh et al. | |
| 7,065,657 B1 | 6/2006 | Moran | |
| 7,073,198 B1 | 7/2006 | Flowers et al. | 726/25 |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,133,916 B2 | 11/2006 | Schunemann | |
| 7,134,141 B2 | 11/2006 | Crosbie et al. | |
| 7,152,105 B2 | 12/2006 | McClure et al. | 709/224 |
| 7,174,566 B2 | 2/2007 | Yadav | |
| 7,181,769 B1 | 2/2007 | Keanini et al. | |
| 7,257,630 B2 | 8/2007 | Cole et al. | 709/224 |
| 7,305,708 B2 | 12/2007 | Norton et al. | |
| 7,310,688 B1 | 12/2007 | Chin | 709/252 |
| 7,313,695 B2 | 12/2007 | Norton et al. | |
| 7,315,801 B1 | 1/2008 | Dowd et al. | |
| 7,317,693 B1 * | 1/2008 | Roesch et al. | 370/252 |
| 7,346,922 B2 | 3/2008 | Miliefsky | |
| 7,350,077 B2 * | 3/2008 | Meier et al. | 713/171 |
| 7,363,656 B2 | 4/2008 | Weber et al. | |
| 7,467,202 B2 | 12/2008 | Savchuk | |
| 7,596,807 B2 | 9/2009 | Ptacek et al. | |
| 7,644,275 B2 * | 1/2010 | Mowers et al. | 713/168 |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 | 7/2002 | Mustafa | |
| 2002/0112185 A1 | 8/2002 | Hodges | |
| 2002/0123995 A1 | 9/2002 | Shibuya | |
| 2002/0165707 A1 | 11/2002 | Call | |
| 2003/0009699 A1 | 1/2003 | Gupta et al. | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini et al. | |
| 2003/0101353 A1 | 5/2003 | Tarquini et al. | 713/200 |
| 2003/0126472 A1 | 7/2003 | Banzhof | |
| 2003/0140250 A1 | 7/2003 | Taninaka et al. | |
| 2003/0195874 A1 | 10/2003 | Akaboshi | |
| 2003/0212910 A1 | 11/2003 | Rowland et al. | |
| 2003/0217283 A1 | 11/2003 | Hrastar et al. | |
| 2003/0229726 A1 | 12/2003 | Daseke et al. | |
| 2004/0010684 A1 * | 1/2004 | Douglas | 713/168 |
| 2004/0015728 A1 | 1/2004 | Cole et al. | |
| 2004/0034773 A1 | 2/2004 | Balabine et al. | |
| 2004/0064726 A1 | 4/2004 | Girouard | |
| 2004/0073800 A1 | 4/2004 | Shah et al. | |
| 2004/0093582 A1 | 5/2004 | Segura | |
| 2004/0098618 A1 | 5/2004 | Kim et al. | |
| 2004/0123153 A1 | 6/2004 | Wright et al. | |
| 2004/0172234 A1 | 9/2004 | Dapp et al. | |
| 2004/0179477 A1 | 9/2004 | Lincoln et al. | |
| 2004/0193943 A1 | 9/2004 | Angelino et al. | |
| 2004/0210756 A1 * | 10/2004 | Mowers et al. | 713/168 |
| 2004/0218532 A1 * | 11/2004 | Khirman | 370/235 |
| 2004/0221176 A1 | 11/2004 | Cole | |
| 2004/0250032 A1 * | 12/2004 | Ji et al. | 711/162 |
| 2004/0268358 A1 | 12/2004 | Darling et al. | |
| 2005/0005169 A1 | 1/2005 | Kelekar | |
| 2005/0015623 A1 | 1/2005 | Williams et al. | |
| 2005/0044422 A1 | 2/2005 | Cantrell et al. | |
| 2005/0076066 A1 * | 4/2005 | Stakutis et al. | 707/200 |
| 2005/0108393 A1 | 5/2005 | Banerjee et al. | |
| 2005/0113941 A1 | 5/2005 | Ii et al. | |
| 2005/0114700 A1 | 5/2005 | Barrie et al. | |
| 2005/0160095 A1 | 7/2005 | Dick et al. | |
| 2005/0172019 A1 | 8/2005 | Williamson et al. | |
| 2005/0188079 A1 | 8/2005 | Motsinger et al. | |
| 2005/0229255 A1 | 10/2005 | Gula et al. | |
| 2005/0240604 A1 | 10/2005 | Corl, Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273673 A1 * | 12/2005 | Gassoway | 714/45 |
| 2005/0273857 A1 | 12/2005 | Freund | |
| 2006/0174337 A1 | 8/2006 | Bernoth | |
| 2006/0265748 A1 | 11/2006 | Potok | |
| 2006/0294588 A1 | 12/2006 | Lahann et al. | |
| 2007/0027913 A1 * | 2/2007 | Jensen et al. | 707/104.1 |
| 2007/0058631 A1 | 3/2007 | Mortier et al. | |
| 2007/0162463 A1 | 7/2007 | Kester et al. | |
| 2007/0192863 A1 | 8/2007 | Kapoor et al. | |
| 2007/0195797 A1 * | 8/2007 | Patel et al. | 370/400 |
| 2007/0271371 A1 | 11/2007 | Singh Ahuja et al. | |
| 2007/0288579 A1 | 12/2007 | Schunemann | |
| 2008/0168561 A1 | 7/2008 | Durie et al. | |
| 2009/0028147 A1 | 1/2009 | Russell | |
| 2009/0041020 A1 * | 2/2009 | Gibbons et al. | 370/394 |

FOREIGN PATENT DOCUMENTS

| | | | |
|---|---|---|---|
| WO | WO 01/37511 A2 | 5/2001 | |
| WO | WO 2004/100011 A1 | 11/2004 | |
| WO | WO 2005/064884 A1 | 7/2005 | |
| WO | WO 2006/025050 A2 | 3/2006 | |

OTHER PUBLICATIONS

Office Action issued on Feb. 5, 2008 in connection with the related U.S. Appl. No. 10/843,375.

Spitzner, Lance; Passive Fingerprinting, May 3, 2003; Focus on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

Office Action issued by the U.S. Patent Office on Jul. 6, 2009 in connection with related U.S. Appl. No. 10/843,459.

Office Action issued by the U.S. Patent Office on Jul. 7, 2009 in connection with related U.S. Appl. No. 10/843,398.

Office Action issued by the U.S. Patent Office on Jul. 28, 2009 in connection with related U.S. Appl. No. 10/843,353.

Office Action issued by the U.S. Patent Office on Jul. 30, 2009 in connection with related U.S. Appl. No. 11/493,934.

Office Action issued by the U.S. Patent Office on Aug. 20, 2009 in connection with related U.S. Appl. No. 10/843,374.
International Preliminary Report on Patentability mailed on Sep. 11, 2009 in connection with corresponding PCT application No. PCT/US08/002454.
Advisory Action issued by the U.S. Patent Office on Sep. 29, 2009 in connection with related U.S. Appl. No. 10/843,459.
U.S. Appl. No. 10/843,353, May 2004, Roesch et al., System and Method for Determining Characteristics of a Network and Analyzing Vulnerabilities.
U.S. Appl. No. 10/843,373, May 2004, Roesch et al., Systems and Methods for Identifying the Services of a Network.
U.S. Appl. No. 10/843,374, May 2004, Roesch et al., System and Methods for Determining Characteristics of a Network Based on Flow Analysis.
U.S. Appl. No. 10/843,375, May 2004, Roesch et al., Systems and Methods for Determining Characteristics of a Network and Assessing Confidence.
U.S. Appl. No. 10/843,398, May 2004, Roesch et al., Systems and Methods for Determining Characteristics of a Network.
U.S. Appl. No. 10/843,459, May 2004, Roesch et al., Systems and Methods for Determining Characteristics of a Network and Enforcing Policy.
U.S. Appl. No. 10/898,220, Jul. 2004, Norton et al., Methods and Systems for Multi-Pattern Searching.
U.S. Appl. No. 10/951,796, Sep. 2004, Roelker et al., Intrusion Detection Strategies for Hypertext Transport Protocol.
U.S. Appl. No. 11/272,033, Nov. 2005, Dempster et al., Systems and Methods for Identifying the Client Applications of a Network.
U.S. Appl. No. 11/272,034, Nov. 2005, Vogel III et al., Systems and Methods for Modifying Network Map Attributes.
U.S. Appl. No. 11/272,035, Nov. 2005, Gustafson et al., Intrusion Event Correlation with Network Discovery Information.
U.S. Appl. No. 11/493,934, Jul. 2006, Roesch et al., Device, System and Method for Analysis of Fragments in a Fragment Train.
U.S. Appl. No. 11/501,776, Aug. 2006, Roesch et al., Device, System and Method for Analysis of Segments in a Transmission Control Protocol (TCP) Session.
U.S. Appl. No. 11/785,609, Apr. 2007, Norton et al., Methods and Systems for Multi-Pattern Searching.
U.S. Appl. No. 11/905,980, Oct. 2007, Roesch, Device, System and Method for Use of Micro-Policies in Intrusion Detection/Prevention.
U.S. Appl. No. 12/010,900, Jan. 2008, Norton et al., Methods and Systems for Multi-Pattern Searching.
U.S. Appl. No. 12/149,196, Apr. 2008, Rittermann, Real-Time User Awareness for a Computer Network.
U.S. Appl. No. 12/230,338, Aug. 2008, Sturges et al., Speed and Memory Optimization of Intrusion Detection System (IDS) and Intrusion Prevention System (IPS) Rule Processing.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
T. Ptacek, et al., "Insertion, Evasion, and Denial of Service: Eluding Network Intrusion Detection", Jan. 1998, pp. 1-63.
N. Chase, "Active Server Pages 3.0 from Scratch" (Dec. 1999), Searching for products section, 13 pp.
B. Krishnamurthy, "Web Protocols and Practice," (May 1, 2001), pp. 518-520.
U. Shankar and V. Paxson, *Active Mapping: Resisting NIDS Evasion Without Altering Traffic*, Proc. IEEE Symposium on Security and Privacy. May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
Norton et al., "Multi-Patten Search Engine Aho-Corasick State Machine" (Mar. 17, 2004), Version 2.0, 36 pp.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.

Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"toupper()—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.

International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
R. Deraison, et al., "Passive Vulnerability Scanning. Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/lsi/pcwLSI/text/node150.html.
R. Deraison, et al., "Nessus Network Auditing," *Sungress Publishing*, Jul. 20, 2004, pp. 1-13.
International Preliminary Report on Patentability mailed on Apr. 7, 2009 in connection with PCT application No. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to related U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
J. Howe, "An Environment for "Sniffing" DCE-RPC Traffic," *CITI Technical Report 93-4*, Jun. 21, 1993, 12 pages total.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
International Search Report and Written Opinion of the International Searching Authority issued on Jul. 2, 2008 in connection with corresponding PCT application No. PCT/US08/02454.
R. Gula, "Passive Vulnerability Detection. *Techniques to passively find network security vulnerabilities*," Sep. 9, 1999 (5 pp.).
R.P. Lippmann et al., "Passive Operating System Identification from TCP/IP Packet Headers," *Proceedings Workshop on Data Mining for Computer Security (DMSEC)*, Nov. 2003, (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Advisory Action issued by the U.S. Patent Office on Feb. 24, 2010 in connection with related U.S. Appl. No. 11/272,035.
Office Action issued by the U.S. Patent Office on Mar. 22, 2010 in connection with related U.S. Appl. No. 11/493,934.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Notice of Allowance issued by the U.S. Patent Office on Feb. 5, 2010 in connection with related U.S. Appl. No. 11/272,034.
Office Action issued by the U.S. Patent Office on Mar. 16, 2010 in connection with related U.S. Appl. No. 11/272,035.
International Search Report and Written Opinion of the International Searching Authority issued on Mar. 16, 2010 in connection with PCT application No. PCT/US09/59965, which corresponds to U.S. Appl. No. 12/575,612.
U.S. Appl. No. 12/813,859, filed Jun. 2010, Polley et al.
D. Joseph, et al., "A Policy-aware Switching Layer for Data Centers," *SIGCOMM*, Aug. 17-22, 2008, pp. 51-62.
Office Action issued by the U.S. Patent Office on Apr. 15, 2010 in connection with related U.S. Appl. No. 12/010,900.
Office Action issued by the U.S. Patent Office on Apr. 21, 2010 in connection with related U.S. Appl. No. 10/843,459.
Notice of Allowance issued by the U.S. Patent Office on May 24, 2010 in connection with related U.S. Appl. No. 10/843,398.
U.S. Appl. No. 12/969,682, filed Dec. 2010, Roesch et al.

"Enhanced Operating System Identification with Nessus," *Tenable Network Security* (2007), obtained from: http://blog.tenablesecurity.com/2009/02/enhanced_operat.html, posted by R. Gula on Feb. 16, 2009 (3 pp. total).
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with related U.S. Appl. No. 10/843,459.
Final Office Action issued by the U.S. Patent Office on Nov. 24, 2010 in connection with related U.S. Appl. No. 12/010,900.
Office Action issued by the U.S. Patent Office on Dec. 22, 2010 in connection with related U.S. Appl. No. 11/905,980.
"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).
V. Yegneswaran, et al., "Internet Sieve: An Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).
D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).
M. Norton, et al., "The New Snort," *Computer Security Journal*, CSI Security Institute, XIX, No. 3 (Jan. 1, 2003), pp. 37-47, ISSN: 0277-0865 (XP008039475.
European Search Report issued by the European Patent Office on Dec. 6, 2010 in connection with European patent application No. 05773540.9-2413, which corresponds to related U.S. Patent No. 7,496,962.
Notice of Allowance issued by the U.S. Patent Office on Jan. 24, 2011 in connection with related U.S. Appl. No. 10/843,459.
Notice of Allowance issued by the U.S. Patent Office on Feb. 24, 2011 in connection with related U.S. Appl. No. 11/493,934.
R. Hiyoshi, "Practical Guide to Intrusion Detection System: Snort & Tripwire," Japan, Apr. 25, 2004, pp. 57-230 (concise English explanation of relevance attached).
Advisory Action issued by the U.S. Patent Office on Aug. 3, 2010 in connection with related U.S. Appl. No. 10/843,374.

Final Office Action issued by the U.S. Patent Office on Sep. 8, 2010 in connection with related U.S. Appl. No. 10/843,459.
Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Final Office Action issued by the U.S. Patent Office on Sep. 30, 2010 in connection with related U.S. Appl. No. 11/493,934.
U.S. Appl. No. 13/046,127, filed Mar. 11, 2011, Roesch.
U.S. Appl. No. 13/086,819, filed Apr. 4, 2011, Olney et al.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx , Dec. 1, 2009.
Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 13, 2011 in connection with related U.S. Appl. No. 12/230,338.
Office Action issued by the U.S. Patent Office on May 12, 2011 in connection with related U.S. Appl. No. 12/149,196.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection with PCT patent application No. PCT/US2009/059965, which corresponds to U.S. Appl. No. 12/575,612.
Office Action issued by the U.S. Patent Office on May 31, 2011 in connection with related U.S. Appl. No. 12/688,400.
Notice of Allowance issued by the U.S. Patent Office on Jun. 22, 2011 in connection with related U.S. Appl. No. 11/272,035.
Extended European Search Report issued by the European Patent Office on Jul. 19, 2011 in connection with European patent application No. 06837333.1-2413, which corresponds to related U.S. Patent No. 7,733,803.
International Search Report and Written Opinion of the International Searching Authority issued on Jul. 28, 2011 in connection with PCT application No. PCT/US2011/032489, which corresponds to U.S. Appl. No. 13/086,819.
Matthew Olney et al.: "What would you do with a pointer and a size? A New Detection Framework", Apr. 22, 2010, XP55002567, http://labs.snort.org/nrt/sfvrt-nrt.pdf (retrieved on Jul. 12, 20111) the whole document.

* cited by examiner

DEVICE, SYSTEM AND METHOD FOR TIMESTAMP ANALYSIS OF SEGMENTS IN A TRANSMISSION CONTROL PROTOCOL (TCP) SESSION

FIELD OF THE INVENTION

The present invention relates in general to network traffic analysis, and more specifically to determining whether segments in a transmission control protocol (TCP) connection are acceptable, optionally in connection with intrusion detection/prevention.

BACKGROUND OF THE INVENTION

The transport layer protocol utilized in packet network communications can include extensions such as a TCP timestamp option, which is used by many current operating systems. TCP timestamps can provide an indication of when to discard delayed segments—a process known as Protection Against Wrapped Sequences (PAWS). The current Request for Comments (RFC) addressing TCP extensions for high performance, RFC 1323, summarizes the timestamp as "From the receiver's viewpoint, the timestamp is acting as a logical extension of the high-order bits of the sequence number." Accordingly, a segment which the receiving host regards as delayed per the timestamp can be discarded by the receiving host.

However, if an intrusion detection or prevention system (IDS/IPS) utilizes a single method for analyzing and filtering segments based on timestamps, it may not analyze the same reassembled payload as a particular operating system at the destination. Consequently, an attack might successfully employ TCP timestamp value mutations to evade detection. The potential for evasion using TCP timestamps has apparently gone unnoticed.

SUMMARY OF THE INVENTION

Accordingly, one or more embodiments of the present invention provide methods, systems, and computer readable mediums, optionally for an intrusion detection/prevention system, for determining whether a transmission control protocol (TCP) segment in a TCP connection in a communication network is acceptable, the TCP connection including a plurality of TCP segments beginning with a three way handshake, wherein a TCP segment includes a field for a timestamp. A timestamp policy of plural timestamp policies is identified, the timestamp policy corresponding to a target associated with the segments in a TCP connection. A baseline timestamp is identified based on a three way handshake in the TCP connection. Segments in the TCP connection are monitored. The segments in the TCP connection are filtered as indicated in the timestamp policy corresponding to the target, the timestamp policy indicating whether the segments are to be filtered out or forwarded to the target by comparing the timestamp of the segments to the baseline timestamp.

Other embodiments provide methods, computer systems, devices and computer readable mediums for detecting or preventing intrusion. A unit is configured to facilitate determining a kind of host associated with a target, in response to an indication of the target in segments in a transmission control protocol (TCP) connection. A segment filtering unit is configured to facilitate identifying a timestamp policy of plural timestamp policies, the timestamp policy corresponding to the target associated with the segments in the TCP connection, the timestamp policy indicating whether the segments are to be filtered out or retained for the target by comparing the timestamp of the segments to a baseline timestamp, the baseline timestamp being based on a three way handshake in the TCP connection, and providing the segments in the TCP connection if retained.

Still other embodiments provide for a computer-readable medium having instructions for execution by a computer, the instructions including a computer-implemented method performed in an intrusion detection/prevention system, for analyzing segments in a transmission control protocol (TCP) connection in a communication network, the TCP connection including TCP segments beginning with a three way handshake, wherein a TCP segment includes a field for a timestamp and a field for a sequence number. The instructions include monitoring a plurality of segments in a TCP connection. Also, the instructions include filtering the segments in the TCP connection as indicated in a timestamp policy corresponding to the target, the timestamp policy indicating whether the segments are to be filtered out or forwarded to the target by comparing the timestamp of the segments to the baseline timestamp and by evaluating sequence numbers identified in the segments to determine whether the timestamp is valid for the target relative to the timestamps of prior segments in the sequence according to the sequence numbers.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
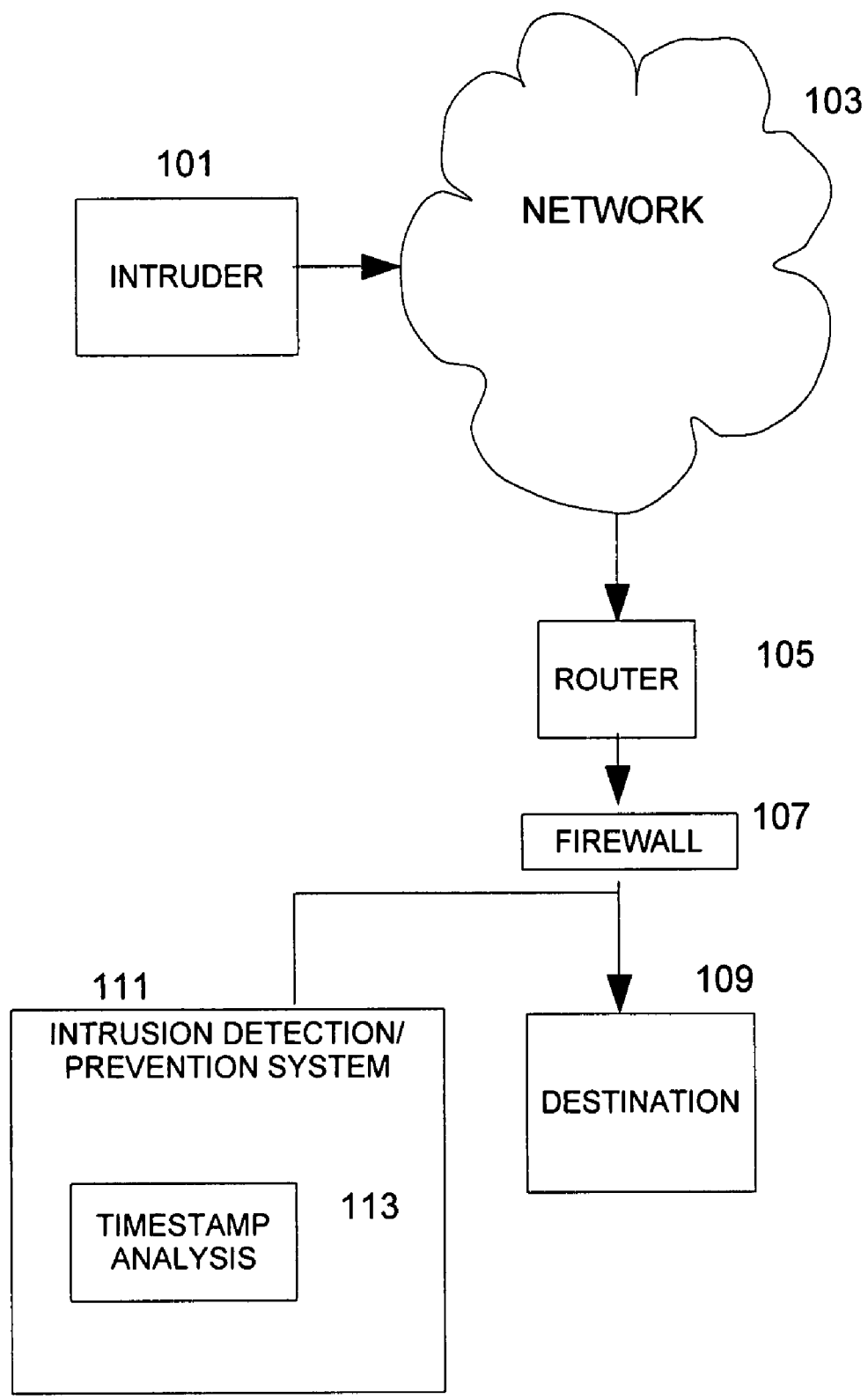
FIG. 1 is a diagram illustrating a simplified and representative environment associated with timestamp analysis.

In overview, the present disclosure concerns analysis of network traffic on communication networks, often referred to as packet switching networks, which support communication from wireless and/or wire line devices to a destination. Such communication networks may carry transmission control protocol (TCP) segments. More particularly, various inventive concepts and principles are embodied in systems, devices, and methods therein for analyzing segments, optionally in connection with intrusion detection/prevention systems.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein, various inventive principles and combinations thereof are advantageously employed to improve analysis of TCP segments. Different operating systems honor old or unusual TCP timestamps uniquely. This may provide an attacker an opportunity to evade detection, especially when old or unusual TCP timestamps are used in conjunction with overlapping TCP segments. Overlapping segments are discussed in the inventors' application Ser. No. 11/501,776, filed Aug. 10, 2006, "Device, system and method for analysis of segments in a transmission control protocol (TCP) session," expressly incorporated herein by reference. If an intrusion detection system (IDS)/intrusion prevention system (IPS) and target destination host do not reassemble the TCP segments identically, they will not see the same reassembled payload. An attacker can use such an evasion to exploit a vulnerability and go unnoticed.

The analysis of segments can be target-based, that is, the analysis can consider the operating system and applications at the destination, so that traffic sent to the destination can be analyzed in the same manner as the destination itself analyzes the traffic, or so that improper segments can be filtered out of the traffic. Moreover, segments with deliberately manipulated timestamps are less likely to dupe the intrusion detection/prevention system.

Further in accordance with exemplary embodiments, the problems posed by timestamps in segments can be address by providing timestamp policies, corresponding to destination systems and/or the kinds of hosts associated with destinations. Thus, the timestamp analysis can select the appropriate one of the timestamp policies depending on the destination, and can filter the segments according to the timestamp policy, thereby reducing evasion attacks that manipulate timestamps.

Referring to FIG. 1, a diagram illustrating a simplified and representative environment associated with timestamp analysis will be discussed and described. In the illustration, an intruder 101 (such as a computer system) transmits transmissions to a destination 109. In this example, the transmission is transmitted via a network 103, a router 105, and a firewall 107 to the destination 109. The communications to the destination 109 can be monitored in accordance with well known techniques by an intrusion detection/prevention system 111, such as with a sensor. Although this illustration provides a sensor behind the firewall 107, the sensor can be provided anywhere before the destination 109. Alternatively, the intrusion detection/prevention system 111 can be provided in-line with the destination 109, or can be incorporated into the destination 109.

A transmission can be stamped with a timestamp at the origination, and optionally segmented at the transmission control protocol ("TCP") layer into segments, all in accordance with known techniques. The TCP connection including the transmission is sent to the destination 109, and the destination 109 reassembles the segments into the transmission. The order in which the destination 109 reassembles segments and whether segments with various timestamps are accepted are both a by-product of processing in the particular operating system on the destination 109, such as whether a timestamp is acceptable in the particular sequence of segments. The method in which segments are dropped or reassembled by a particular operating system can be exploited by the intruder 101. Note that although this illustration assumes an intruder 101 sending transmissions or segments, the transmissions or segments that are analyzed can be sent from anywhere.

Figure 2:
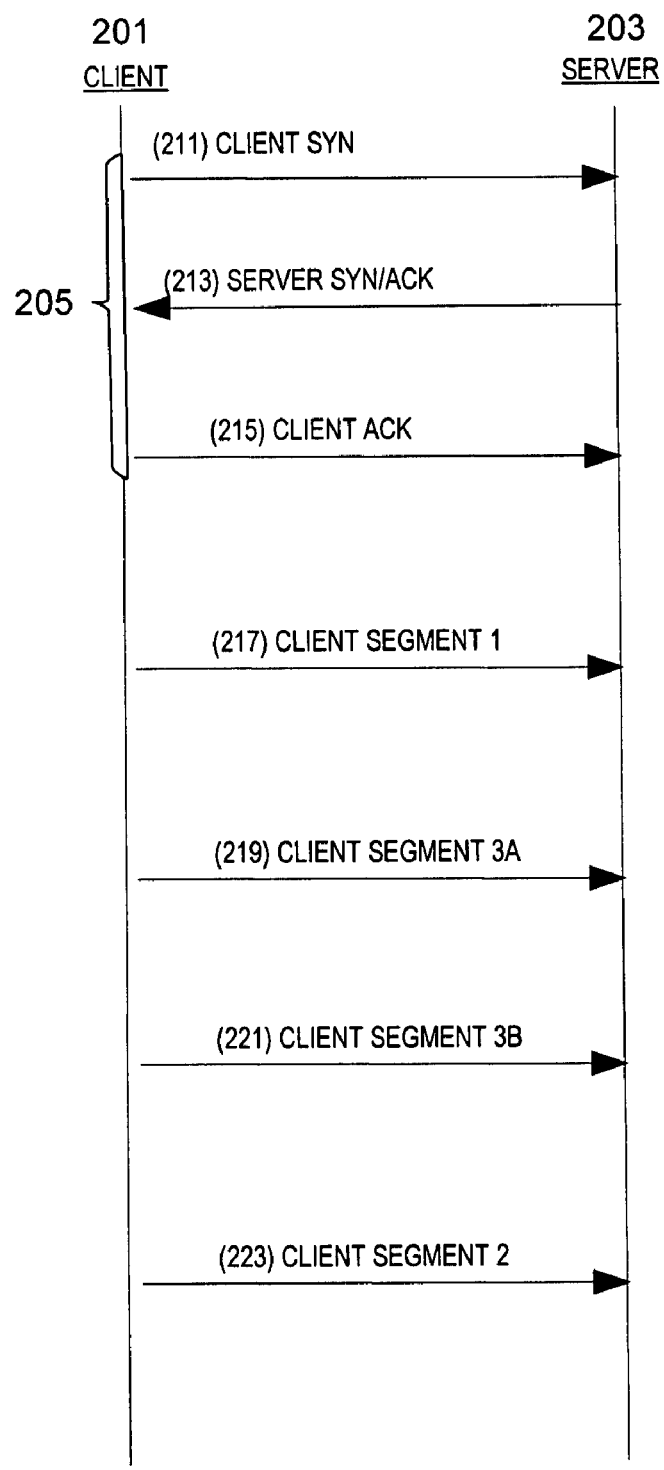
FIG. 2 is a diagram illustrating a simplified packet flow associated with timestamp analysis.

Referring to FIG. 2, a diagram illustrating a simplified packet flow associated with timestamp analysis will be discussed and described. In this example, a TCP connection begins when a client 201 establishes a three-way handshake 205 with a server 203. In accordance with conventional methods for a three-way handshake, the client 201 sends a client SYN packet 211, the server 203 responds with a server SYN/ACK packet 213, and then the client 201 sends a client ACK packet 215. Once the three-way handshake 205 is established, the client 201 and server 203 can begin communicating by sending/receiving additional packets in the TCP connection. The subsequent ACK packets from the server 203 have been omitted from the illustration for clarity.

If the three-way handshake establishes a baseline timestamp of 10, for example, all subsequent timestamps are expected to have a timestamp greater than 10 to be valid. Furthermore, segments which arrive include sequence numbers. The timestamps are expected to be chronologically consistent with the sequence numbers. However, this chronological consistency among timestamps and sequence numbers is subject to interpretation in scenarios including, for example, (1) zero/non-zero timestamps, (2) timestamps which are not used, (3) variable establishment of initial baseline timestamp, (4) handling of delayed, out-of-sequence packets, (5) effect of overlapping segments, and (6) running update of baseline timestamp, also referred to herein as an "intermediate comparison" timestamp.

Consider the example in FIG. 2, where a first client segment 1 217 is received by the server 203, then receipt of a second client segment 2 223 is delayed. Therefore, overlapping third client segments 3A and 3B 219, 221 are received prior to receipt of second client segment 2 223.

Segments 3A and 3B 219, 221 are considered to be wholly overlapping because they start and end with the same TCP sequence number, but they have a different payload. However, because timestamp processing precedes overlap processing, overlapping segments 3A and 3B 219, 221 are a target-based concern only if they both have valid timestamps. If, for example, segment 3A 219 has a timestamp which is older than the baseline timestamp, the receiving host (e.g., server 203) should not accept segment 3A 219.

Now, a more particular example of behavior of the server 203 receiving the segments is examined. Consider the following sequence of packets with timestamps, in the data flow of FIG. 2, which illustrates seven packets 211-223 with the specified timestamp (TS):

| | |
|---|---|
| Packet 1 is: Client SYN: | TS 0 |
| Packet 2 is: Server SYN/ACK | TS 2000 |
| Packet 3 is: Client ACK | TS 0 |
| Packet 4 is: Client Segment 1 | TS 10 |
| Packet 5 is: Client Segment 3A | TS 3 |
| Packet 6 is: Client Segment 3B | TS 30 |
| Packet 7 is: Client Segment 2 | TS 20 |

In the above packet sequence example, the client 201 has timestamp values of zero on the three-way handshake 205, followed by a segment 1 217 with a timestamp of 10. Next, segments 3A and 3B 219, 221 wholly overlap each other, but have a different payload and segment 3A 219 has an old timestamp. Finally, delayed segment 2 223 arrives with a timestamp that is valid for its chronological TCP sequence number.

A possible expected behavior is that the timestamp of segment 1 217 becomes the initial baseline timestamp and the receiver (e.g., server 203) compares timestamp values found in segments 3A and 3B 219, 221 to this initial baseline timestamp pending the arrival of segment 2 223. When segment 2 223 is received, then the timestamp of segment 2 223 is compared to the initial baseline timestamp (still the timestamp of segment 1). With all of the segments having been received in sequence, the baseline timestamp can then be updated to the timestamp of the sequentially last acceptable segment (that is, the "intermediate comparison timestamp") for comparison in determining acceptability of subsequent timestamps. In this example, if the arrival of segment 3 is deemed complete by the server 203 (despite the unacceptability of segment 3A), then the baseline timestamp can be updated to the timestamp of segment 3B 221, which is then the intermediate comparison timestamp. This is just a brief example of the complex data flow combinations that can affect how a host (e.g., server 203) performs timestamp processing.

The inventors developed a set of tests to study the behavior of various receiving hosts in response to various combinations of modified timestamps. The expected behavior did not always occur. For example, under certain conditions, some operating systems appear to suspend examination of timestamps or ignore the use of timestamps altogether from segments that arrive before a delayed segment.

The current RFC addressing TCP extensions, RFC 1323, does not elaborate how a host should respond when it receives zero timestamp values on the three-way handshake, or when it receives segments with no TCP timestamp option and associated values even though both hosts have negotiated the use of timestamps. The inventors observed that segment 1 (the first sequential segment after a three-way handshake) can have a special yet undocumented value in terms of timestamps. The point of the tests which were conducted was to determine how different kinds of servers respond to different combinations of TCP timestamp values when they receive overlapping segments.

Each timestamp test discussed in the following Table 1 through Table 4 follows the same basic flow illustrated in FIG. 2. The following Table 5 has the results of these tests for different operating systems. The illustrated tests are not intended to be comprehensive but rather illustrate the complexities of combinations of timestamps and sequences. Therefore timestamp policies are not limited to the examples provided herein.

The data used in the wholly overlapping segments in the tests was selected to return different responses depending on which segments were accepted. If one overlapping segment was accepted, a non-error response was returned, whereas erroneous responses were returned if both overlapping segments were dropped.

Table 1 illustrates a test referred to as "Round 1, Case 1" or "R1-C1". In this test, the client timestamp values on the three-way handshake ("3whs") are zero; segment 1 arrives first and has a timestamp value of 11111. Segments 3A and 3B contain various timestamp values and options: no timestamp options, old timestamps, or valid timestamps. Delayed segment 2 arrives last with a valid timestamp value of 12345. It is expected that the receiving host will examine segments 3A and 3B relative to segments 1's timestamp.

TABLE 1

(Round 1, Case 1):

| Test | 3whs | Segment 1 | Segment 3A | Segment 3B | Segment 2 |
|---|---|---|---|---|---|
| Test 1 | Ts = 0 | Ts = 11111 | Ts = 22222 | Ts = 33333 | Ts = 12345 |
| Test 2 | Ts = 0 | Ts = 11111 | No timestamp | Ts = 33333 | Ts = 12345 |
| Test 3 | Ts = 0 | Ts = 11111 | Ts = 22222 | No timestamp | Ts = 12345 |
| Test 4 | Ts = 0 | Ts = 11111 | Ts = 22222 | Ts = 22222 | Ts = 12345 |
| Test 5 | Ts = 0 | Ts = 11111 | No timestamp | No timestamp | Ts = 12345 |
| Test 6 | Ts = 0 | Ts = 11111 | Ts = 33333 | Ts = 22222 | Ts = 12345 |
| Test 7 | Ts = 0 | Ts = 11111 | Ts = 0 | Ts = 0 | Ts = 12345 |
| Test 8 | Ts = 0 | Ts = 11111 | Ts = 22222 | Ts = 3 | Ts = 12345 |
| Test 9 | Ts = 0 | Ts = 11111 | Ts = 3 | Ts = 22222 | Ts = 12345 |

Table 2 illustrates a test referred to as "Round 1, Case 2" or "R1-C2." In this test, the client timestamp values on the three-way handshake are non-zero; segment 1 arrives first and has a timestamp value of 11111. Segments 3A and 3B contain various timestamp values and options: no timestamp options, old timestamps, or valid timestamps. Delayed segment 2 arrives last with a valid timestamp value of 12345. It is expected that the receiving host will examine segments 3A and 3B relative to segments 1's timestamp.

TABLE 2

(Round 1, Case 2):

| Test | 3whs | Segment 1 | Segment 3A | Segment 3B | Segment 2 |
|---|---|---|---|---|---|
| Test 1 | Ts = 10000 | Ts = 11111 | Ts = 22222 | Ts = 33333 | Ts = 12345 |
| Test 2 | Ts = 10000 | Ts = 11111 | No timestamp | Ts = 33333 | Ts = 12345 |
| Test 3 | Ts = 10000 | Ts = 11111 | Ts = 22222 | No timestamp | Ts = 12345 |
| Test 4 | Ts = 10000 | Ts = 11111 | Ts = 22222 | Ts = 22222 | Ts = 12345 |
| Test 5 | Ts = 10000 | Ts = 11111 | No timestamp | No timestamp | Ts = 12345 |
| Test 6 | Ts = 10000 | Ts = 11111 | Ts = 33333 | Ts = 22222 | Ts = 12345 |
| Test 7 | Ts = 10000 | Ts = 11111 | Ts = 0 | Ts = 0 | Ts = 12345 |
| Test 8 | Ts = 10000 | Ts = 11111 | Ts = 22222 | Ts = 3 | Ts = 12345 |
| Test 9 | Ts = 10000 | Ts = 11111 | Ts = 3 | Ts = 22222 | Ts = 12345 |

Table 3 illustrates a test referred to as "Round 2, Case 1" or "R2-C1." In this test, the client timestamp values on the three-way handshake are zero; segment 1 arrives first but has no timestamp. Test cases for segments 3A and 3B remain the same as Round 1. Delayed segment 2 arrives last with a valid timestamp value of 12345. However, there is no "baseline" timestamp to compare segments 3A and 3B timestamps. It is expected that the receiving host will ignore the timestamps completely for the entire session.

TABLE 3

(Round 2, Case 1):

| Test | 3whs | Segment 1 | Segment 3A | Segment 3B | Segment 2 |
|---|---|---|---|---|---|
| Test 1 | Ts = 0 | No timestamp | Ts = 22222 | Ts = 33333 | Ts = 12345 |
| Test 2 | Ts = 0 | No timestamp | No timestamp | Ts = 33333 | Ts = 12345 |
| Test 3 | Ts = 0 | No timestamp | Ts = 22222 | No timestamp | Ts = 12345 |
| Test 4 | Ts = 0 | No timestamp | Ts = 22222 | Ts = 22222 | Ts = 12345 |
| Test 5 | Ts = 0 | No timestamp | No timestamp | No timestamp | Ts = 12345 |
| Test 6 | Ts = 0 | No timestamp | Ts = 33333 | Ts = 22222 | Ts = 12345 |
| Test 7 | Ts = 0 | No timestamp | Ts = 0 | Ts = 0 | Ts = 12345 |
| Test 8 | Ts = 0 | No timestamp | Ts = 22222 | Ts = 3 | Ts = 12345 |
| Test 9 | Ts = 0 | No timestamp | Ts = 3 | Ts = 22222 | Ts = 12345 |

Table 4 illustrates a test referred to as "Round 2, Case 2" or "R2-C2." In this test, the client timestamp values on the three-way handshake are non-zero; segment 1 arrives first but has no timestamp. Again, test cases for segments 3A and 3B remain the same as Round 1. Delayed segment 2 arrives last with a valid timestamp value of 12345. This time there is a "baseline" timestamp found in the segments of the three-way handshake. It is expected that the receiving host will compare the timestamps in segments 3A and 3B to the timestamp in the three-way handshake.

TABLE 4

(Round 2, Case 2):

| Test | 3whs | Segment 1 | Segment 3A | Segment 3B | Segment 2 |
|---|---|---|---|---|---|
| Test 1 | Ts = 10000 | No timestamp | Ts = 22222 | Ts = 33333 | Ts = 12345 |
| Test 2 | Ts = 10000 | No timestamp | No timestamp | Ts = 33333 | Ts = 12345 |
| Test 3 | Ts = 10000 | No timestamp | Ts = 22222 | No timestamp | Ts = 12345 |
| Test 4 | Ts = 10000 | No timestamp | Ts = 22222 | Ts = 22222 | Ts = 12345 |
| Test 5 | Ts = 10000 | No timestamp | No timestamp | No timestamp | Ts = 12345 |
| Test 6 | Ts = 10000 | No timestamp | Ts = 33333 | Ts = 22222 | Ts = 12345 |
| Test 7 | Ts = 10000 | No timestamp | Ts = 0 | Ts = 0 | Ts = 12345 |
| Test 8 | Ts = 10000 | No timestamp | Ts = 22222 | Ts = 3 | Ts = 12345 |
| Test 9 | Ts = 10000 | No timestamp | Ts = 3 | Ts = 22222 | Ts = 12345 |

Further tests were conducted in which the above series of four sets of tests were repeated, but the arrival order of segments 1 and 2 were switched. The further tests can be referred to as "Round 3, Case 1" ("R3-C1"), "Round 3, Case 2" ("R3-C2"), "Round 4, Case 1" ("R4-C1") and "Round 4, Case 2" ("R4-C2"). This further series of tests was repeated to try to understand the role of segment 1 as the baseline timestamp tests. In the tests, segment 2 had a valid timestamp of 12345 and it arrived before segments 1, 3A and 3B. Yet, the test results revealed that the receiving host does not use segment 2 as a baseline timestamp for later segments 3A and 3B. According to these tests, segment 1 must arrive first when the three-way handshake values are zero in order for old timestamps in segments 3A and 3B to be discarded.

The tests illustrated above were run to evaluate target-based responses of some current operating systems that support the TCP timestamp options: Windows 2000, Windows 2003, AIX, MacOS/BSD, OpenBSD, FreeBSD, HPUX, Linux, and Solaris. Other operating systems may experience different results.

In summary, for a three-way handshake with non-zero timestamp value, the timestamp established in the three-way handshake is expected to be used as the initial baseline timestamp. For a three-way handshake with zero timestamp value, the timestamp in segment 1 is expected to be used as the initial baseline timestamp. Thus, current treatment of the tested operating systems is that either the three-way handshake or segment 1 has the initial baseline timestamp. On the other hand, if segment 2 is delayed, the current treatment of the tested operating systems is that the timestamp in segment 2 or any subsequent segment never becomes the baseline; the receiving host ignores all subsequent timestamps for the duration of the TCP session.

The following Table 5 summarizes the test results of the tested operating systems, and indicates whether the behavior is expected or unexpected as explained above in connection with Table 1 through Table 4. In addition, Table 5 indicates which original timestamp (for example, in three way handshake ("3-whs") or a segment) is used as the initial baseline timestamp.

In Table 5, the first column lists the eight series of tests (R1-C1 is the abbreviation for Round 1, Case 1, and so forth) conducted against each destination host. The expected behavior is listed underneath: timestamps on segments 3A/3B should have a baseline timestamp from the three-way handshake segments, or from segment 1, or no baseline at all so it is expected to revert to favoring segment 3A or 3B based on the target operating system overlap policy instead of the timestamp.

have a timestamp on it. This behavior was present on all test suites, but this oddity alters the expected outcome only when the three-way handshake timestamp values are non-zero and segment 1 has no timestamp. Finally, HPUX 11 ignores the timestamps on any segment that arrives out of order. All of the tests performed altered the timestamp values on segments with out-of-order TCP sequence numbers so the results appear as if the segments had valid timestamps.

The test results show that various operating systems respond uniquely to uncommon and common combinations of TCP timestamp values. A savvy attacker who understands a particular target host's behavior can fabricate TCP timestamps to evade an IDS/IPS that is unaware of the subtleties of TCP timestamps. Consequently, it is insufficient for an IDS/IPS to be aware of the use of TCP timestamps. The IDS/IPS can perform better when it knows how a given target-host will react to timestamp combinations and then it can respond appropriately.

These tests showed that the treatment of the timestamp is target-based. Other operating systems may yield other test results in response to various combinations of TCP timestamp values. Newer versions of the operating systems might handle timestamp values differently from the tested operating systems.

TABLE 5

| Test | Windows 2003 | Win2K-Server | Linux 2-6 | Solaris | HPUX 11 |
|---|---|---|---|---|---|
| R1-C1 | Unexpected. Ignores timestamps | Expected. Segment 1 ts. | TS not supported* | Expected. No timestamp quirk** | Unexpected. Ignores timestamps |
| R1-C2 | Expected. 3whs baseline ts | Expected. 3whs baseline ts | Expected. 3whs baseline ts | Expected. No timestamp quirk** | Unexpected. Ignores timestamps |
| R2-C1 | Expected. No baseline ts | Expected. No baseline ts | TS not supported* | Expected. No timestamp quirk** | Unexpected. Ignores timestamps |
| R2-C2 | Expected. 3whs baseline ts | Expected. 3whs baseline ts | Expected. 3whs baseline ts | Unexpected. Ignores timestamps | Unexpected. Ignores timestamps |
| R3-C1 | Expected. No baseline ts | Expected. No baseline ts. | Ts not supported* | Expected. No timestamp quirk** | Unexpected. Ignores timestamps |
| R3-C2 | Expected. 3whs baseline ts | Expected. 3whs baseline ts | Expected. 3whs baseline ts | Expected. No timestamp quirk** | Unexpected. Ignores timestamps |
| R4-C1 | Expected. No baseline ts | Expected. No baseline ts | Ts not supported.* | Expected. No timestamp quirk** | Unexpected. Ignores timestamps |
| R4-C2 | Expected. 3whs baseline ts | Expected. 3whs baseline ts | Expected. 3whs baseline ts | Unexpected. Ignores some timestamps | Unexpected. Ignores timestamps |

*Linux does not support a TCP timestamp option when the client TCP timestamp option = 0.
**Solaris stops returning the TCP timestamp option if it receives a segment with no timestamp option.

As illustrated in Table 5, Windows 2003 behaves as expected when there is a non-zero timestamp value on the three-way handshake. It ignores old timestamps when the three-way handshake has zero timestamps. This is expected behavior when there is no timestamp on segment 1. However, the receiving host is expected to compare timestamps on segments 3A and 3B to the valid timestamp value on the segment 1 that arrived before segments 3A and 3B.

Windows 2000 Server, AIX, MacOS/BSD/OpenBSD/FreeBSD all respond identically. They all behave as expected. As mentioned above, Linux 2.6 is atypical because it does not reflect the existence of the TCP timestamp option when the client sends a timestamp value of zero in the three-way handshake. Otherwise, it follows the expected behavior. Solaris has a quirk where it no longer honors or sends the TCP timestamp option after it receives a segment that does not Accordingly, one or more embodiments provide for setting the baseline timestamp to the timestamp in the first TCP segment expected after the handshake if properly received, if the timestamp in the three way handshake is zero. Also, one or more embodiments provide for setting the baseline timestamp to the timestamp in the three way handshake, if the timestamp in the three way handshake is non-zero.

Figure 3:
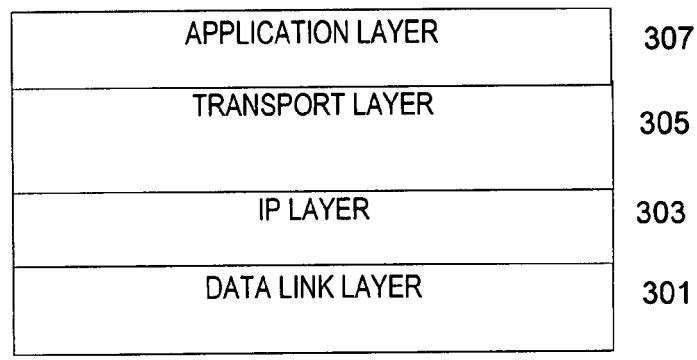
FIG. 3 is a block diagram illustrating TCP/IP layer processing.
Figure 4:
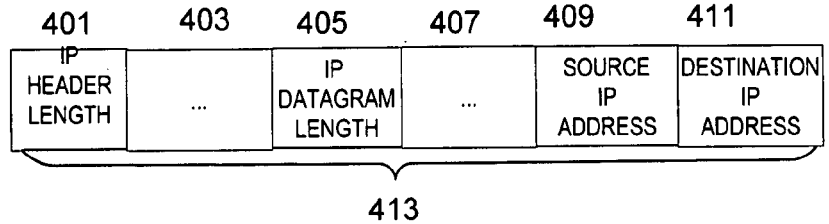
FIG. 4 is a block diagram illustrating portions of an Internet protocol (IP) header in a segment.
Figure 5:
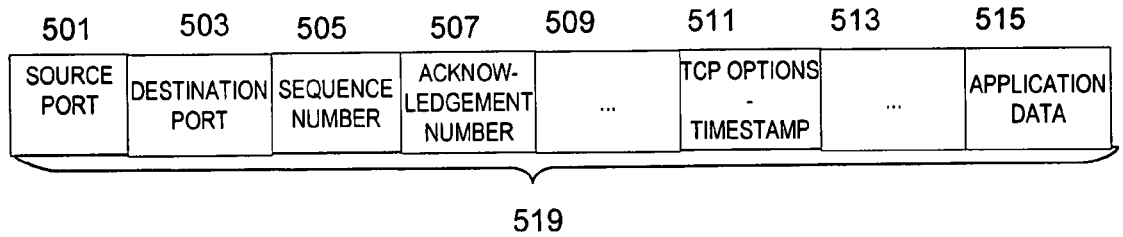
FIG. 5 is a block diagram illustrating portions of a TCP header in a segment.

FIG. 3, FIG. 4 and FIG. 5 illustrate relevant conventions associated with TCP layer processing. FIG. 3 illustrates transport layer processing (sometimes referred to as "TCP layer" processing); FIG. 4 illustrates relevant portions of an Internet protocol (IP) header transporting a segment; and FIG. 5 illustrates relevant portions of a TCP header of a segment.

Referring to FIG. 3, a block diagram illustrating TCP/IP layer processing will be discussed and described. This example illustrates a data link layer 301, an IP layer 303, a transport layer 305, and an application layer 307 which operate on a destination. A packet is received by the destination and processed in accordance with known means at the various layers. For example, an incoming packet is initially received at the data link layer 301; passed to the IP layer 303; passed to the transport layer 305; and then sequentially passed to layers above for additional processing.

Conventions associated with the data link layer 301, the IP layer 303, the transport layer 305 and the application layer 307, and the like are well known. In particular, conventions for formats and protocols of transmissions and of segments in accordance with the transport layer are well known. The segments can be monitored and/or received in accordance with the transport layer protocol, that is, the segments are interpreted in accordance with the transport layer protocol and its formats; more particularly, the transport layer protocol can be a TCP layer protocol. Nevertheless, as explained above, handling of timestamps is not well defined or understood. Typically, timestamp is examined by processing at the transport layer 305.

Accordingly, one or more embodiments provide that the monitoring is performed in accordance with a TCP layer.

Referring to FIG. 4, a block diagram illustrating portions of an Internet protocol (IP) header 413 in a segment will be discussed and described. The illustrated IP header 413 is a portion of a transmission formatted according to the IP layer, which also includes data. The IP header 413 includes an IP header length 401, an IP datagram length 405, an indication of the source IP address 409, and an indication of the destination IP address 411. Other fields 403, 407 typically are included in the IP header 413. These fields are well defined in various industry specifications, as may be modified from time-to-time.

The IP datagram length 405 indicates the length of the content of the IP packet. The destination IP address 411 uniquely identifies the system for which the transmission is destined. The source IP address 409 uniquely identifies the system which originated the transmission.

Referring to FIG. 5, a block diagram illustrating portions of a TCP header 519 in a segment will be discussed and described. Portions of the conventional TCP header 519 which can be referenced include a source port 501, a destination port 503, a TCP sequence number 505, an acknowledgement number 507, TCP options/timestamps field 511, application 515, and miscellaneous other fields 509, 513. These fields also are well defined in various industry specifications, as may be modified from time-to-time.

In this example, the IP packet including the IP header 519 is wrapped around the TCP packet at the IP layer processing before being transmitted. Hence, a transmission which is monitored will include both the IP header 519 and the TCP header (illustrated in FIG. 4). The timestamp is embedded in the options/timestamps field 511 holding the timestamp for a transmission, according to current specifications. Also, the options/timestamps field 511 can indicate that there is no timestamp, according to known conventions. The sequence number 505 is a known field which is utilized in determining the sequence of segments which are to be reassembled.

Accordingly, one or more embodiments provide that the segments are formatted according to a TCP layer format. Furthermore, one or more embodiments provide for identifying a kind of host associated with the target, and selecting the timestamp policy which is associated with the kind of host from plural timestamp policies associated with respective kinds of hosts.

Figure 6:
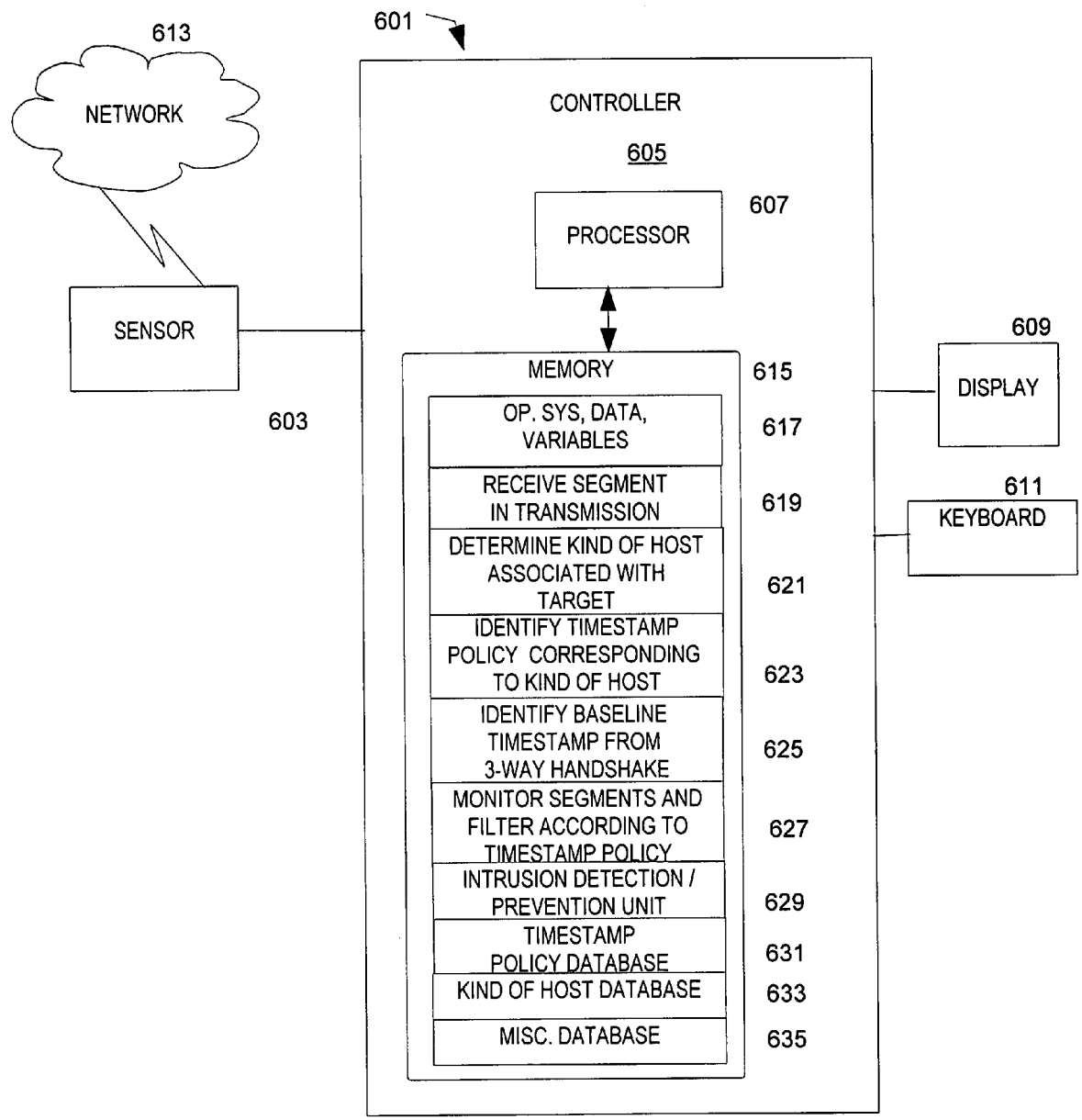
FIG. 6 is a block diagram illustrating portions of an exemplary computer system.

Referring to FIG. 6, a block diagram illustrating portions of an exemplary computer system will be discussed and described. The computer system 601 may include one or more controllers 605, which can receive signals from a sensor 603 which senses communications from a network 613 in accordance with known techniques, where the communications are being sent to a destination (not illustrated). The controller 605 can include a processor 607, a memory 615, an optional display 609, and/or an optional user input device such as a keyboard 611.

The processor 607 may comprise one or more microprocessors and/or one or more digital signal processors. The memory 615 may be coupled to the processor 607 and may comprise a read-only memory (ROM), a random-access memory (RAM), a programmable ROM (PROM), and/or an electrically erasable read-only memory (EEPROM). The memory 615 may include multiple memory locations for storing, among other things, an operating system, data and variables 617 for programs executed by the processor 607; computer programs for causing the processor to operate in connection with various functions such as receiving 619 segments in a transmission, determining 621 a kind of host associated with the target (i.e., destination), identifying 623 the timestamp policy corresponding to the kind of host, identifying 625 a baseline timestamp from a three-way handshake, monitoring 627 segments and filtering according to the timestamp policy, an intrusion detection/prevention unit 629, and/or other processing; a timestamp policy database 631; a kind of host database 633; and a database 635 for other information used by the processor 607. The computer programs may be stored, for example, in ROM or PROM and may direct the processor 607 in controlling the operation of the computer system 601.

The processor 607 optionally may be programmed for receiving 619 segments in a TCP connection in a transmission. In the illustrated example, segments are detected by the sensor 603 connected to the computer system 601 and are supplied to the computer system 601 in accordance with known techniques. Accordingly, one or more embodiments may include a receiving unit configured to facilitate receiving segments in the TCP connection, wherein the segments are received in accordance with a TCP layer.

The processor 607 may be programmed for determining 621 a kind of host associated with the target, sometimes referred to as a destination host. In the typical situation, the target is identified in the segment, for example as a destination IP address found in the IP header. A kind of host database or table can be maintained for known targets, which indicates the kind of host associated with a particular target. The kind of host database or table can be created, for example by manual configuration or by querying certain targets. Thus, the kind of host database or table can be referenced based on the destination identified in the segment to determine the associated kind of host. Alternatively, the segment can include an indication of the kind of host. The kind of host indicates an operating system/platform and optionally a version, for example, HP JetDirect, AIX 2, FreeBSD, HP-UX B10.20, IRIX 4.0, OpenBSD, Open VMS, OS/2, OSF1, LINUX 2.x, MAC OS, WINDOWS, or similar. The kind of host is intended to distinguish between platforms and/or operating systems that react to timestamps differently.

In addition, the processor 607 may be programmed for identifying 623 the timestamp policy corresponding to the kind of host. Having determined the kind of host, an associated timestamp policy can be determined. A particular timestamp policy can be applied in connection with one or more kinds of host. Advantageously, a table or database can indicate one of several timestamp policies to be applied for the particular kind of host. In the illustrated example, the timestamp policy database 631 includes two or more timestamp policies, which can be indexed, for example by the kind of host. The timestamp policies specify how to handle packets received in certain orders (e.g., with respect to three-way handshakes) with timestamps of various relative zero or non-zero values in connection with sequence number of various relative values, for various kinds of hosts.

Once the timestamp policy is identified, the processor 607 can identify 625 the initial baseline timestamp from the three-way handshake, or alternatively from the first segment after the three-way handshake. For example, the timestamp policy for the target host data can indicate whether the timestamp in the three-way handshake, or the first properly received segment after the three-way handshake is used as the initial baseline timestamp.

Also, the processor 607 can be programmed to monitor 627 segments that are received, and filtering the segments according to the timestamp policy. For example, the timestamp policy can specify, for the kind of host associated with the target, whether a delayed packet is to be passed on for further processing or is to be dropped (that is, filtered out).

The optional intrusion detection/prevention unit 629 in the processor 607 can be programmed in accordance with known techniques, to evaluate whether the segments suggest an attempted intrusion. The segments can be filtered as explained above before being passed on, for example to the destination host and/or the intrusion detection/prevention unit 629. The intrusion detection/prevention unit 629 is illustrated as being incorporated into the computer system 601; alternate embodiments can provide that some or all of the intrusion detection/prevention functions are in one or more different computer systems. Further, alternate embodiments provide that the intrusion detection/prevention unit 629 is a host IDS (intrusion detection system) or host IPS (intrusion prevention system); thus the computer system can be the destination.

Accordingly, one or more embodiments may provide for a computer system for detecting or preventing intrusion, including (A) a unit configured to facilitate determining a kind of host associated with a target, in response to an indication of the target in segments in a transmission control protocol (TCP) connection; and (B) a segment filtering unit configured to facilitate identifying a timestamp policy of plural timestamp policies, the timestamp policy corresponding to the target associated with the segments in the TCP connection, the timestamp policy indicating whether the segments are to be filtered out or retained for the target by comparing the timestamp of the segments to a baseline timestamp, the baseline timestamp being identified based on a three way handshake in the TCP connection, and providing the segments in the TCP connection if retained.

Moreover, one or more embodiments may include an intrusion detection/prevention unit to detect an intrusion in the segments, wherein the segment filtering unit provides the filtered segments to the intrusion detection/prevention unit.

The processor 607 may be programmed for a timestamp policy database 631. The timestamp policy database 631 can include two or more timestamp policies. Alternatively, separate code can be provided for implementing the different timestamp policies. The timestamp policy database 631 alternatively can be stored in a remote database and accessed as needed.

The processor 607 may be programmed for a kind of host database 633. The kind of host database 633 can be maintained for known targets, to indicate the kind of host associated with a particular target. Optionally, the kind of host database 633 can be maintained remotely, and relevant kind of host information can be downloaded as needed. Optionally, the kind of host can be indicated in a table rather than a database.

In operation, plural targets can be provided, where targets are associated with respective kinds of hosts, and respective kinds of hosts corresponding to respective timestamp policies; and the timestamp policy which is identified or used corresponds to the kind of host associated with the target. Accordingly, one or more embodiments provides that a plurality of targets including the target are provided, a target being associated with a kind of host, respective kinds of hosts being associated with respective timestamp policies; and the timestamp policy is associated with the kind of host associated with the target.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 7:
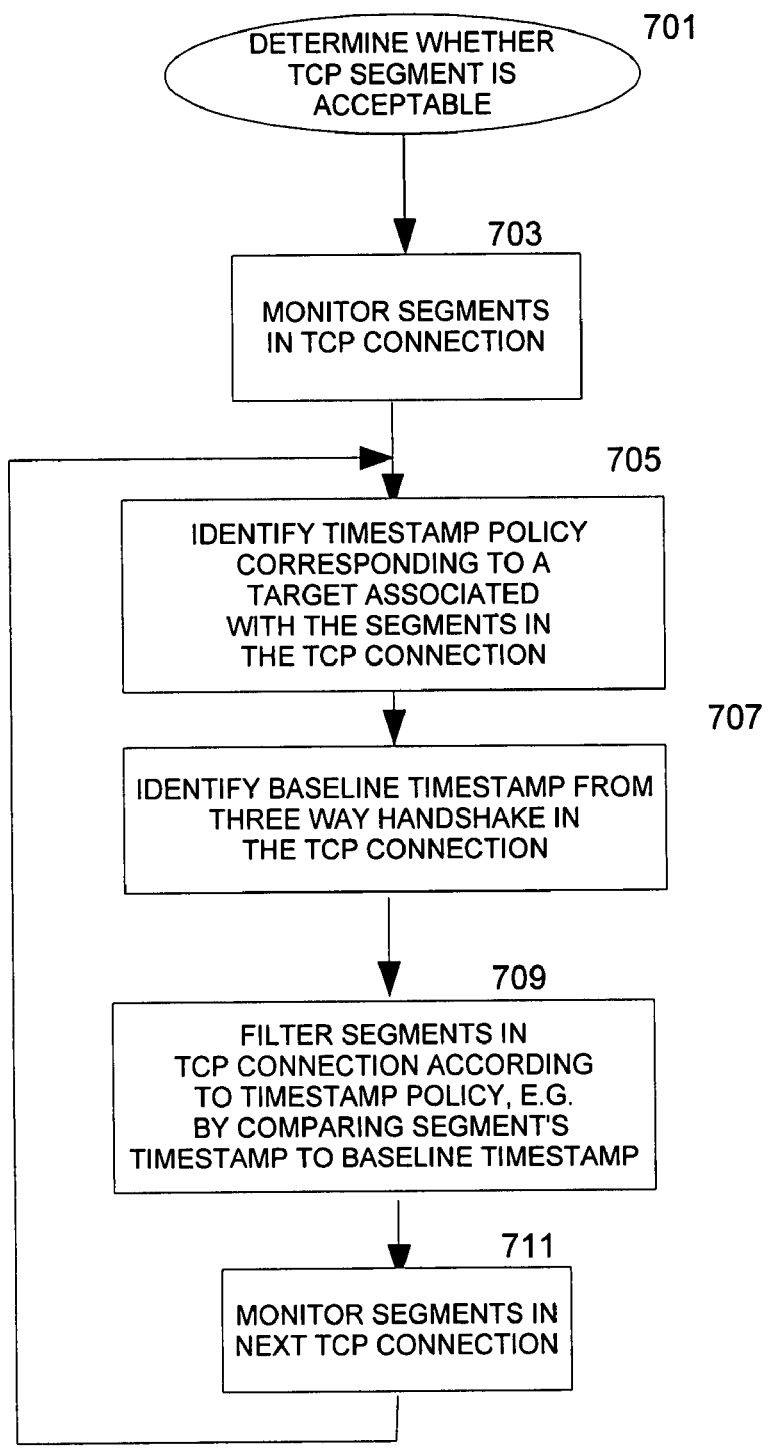
FIG. 7 is a flow chart illustrating an exemplary procedure for determining whether a TCP segment is acceptable.
Figure 8:
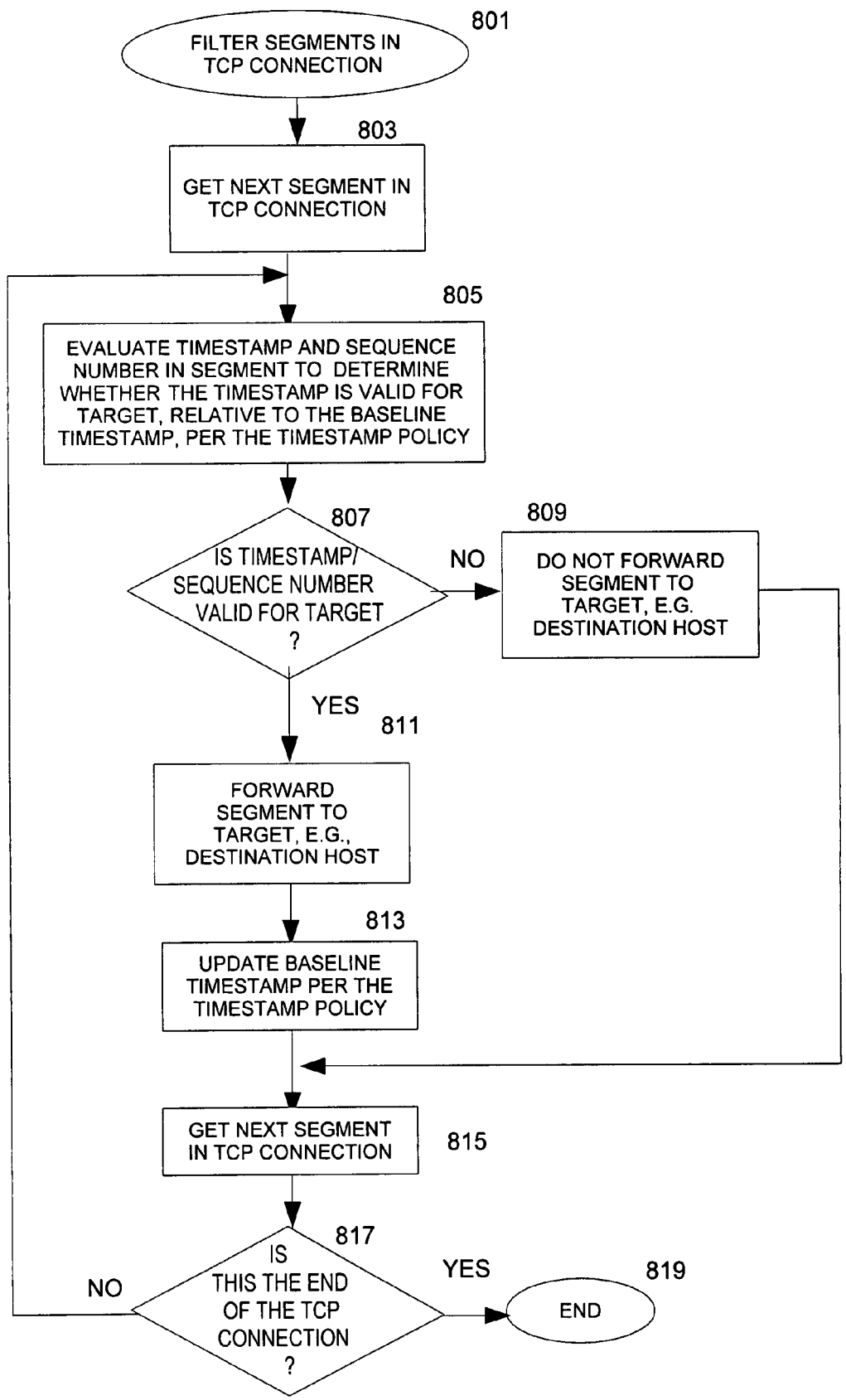
FIG. 8 is a flow chart illustrating an exemplary procedure for filtering segments in a TCP connection.

FIG. 7 and FIG. 8 are flow charts of procedures for analyzing segments. FIG. 7 illustrates an overall procedure for determining whether TCP segments in TCP connections will be acceptable based on timestamps, and FIG. 8 provides a more detailed illustration of determining whether a particular segment will be filtered out. FIGS. 7 and 8 are discussed in more detail below.

Referring to FIG. 7, a flow chart illustrating an exemplary procedure 701 for determining whether a TCP segment is acceptable will be discussed and described. FIG. 7 addresses an overall flow for handling TCP connections with multiple TCP segments, and determining whether a segment is acceptable based on timestamps in the TCP connection.

In overview, the process 701 can include monitoring 703 segments in a TCP connection, identifying 705 a timestamp policy corresponding to a target associated with the segments in the TCP connection, identifying 707 a baseline timestamp based on the three-way handshake in the TCP connection, filtering 709 segments in the TCP connection according to the timestamp policy by comparing segment's timestamp to the baseline timestamp, and monitoring segments 711 in the next TCP connection. Targets can be different from one TCP connection to the next, so when there is a next TCP connection, the procedure can loop to identify 705 the timestamp policy for the target in the next connection, and repeat. These are discussed in more detail below; however, detail is omitted if it has been previously discussed.

The process 701 can include monitoring 703 segments in a TCP connection, for example as described above. For example, the process 701 can identify the start of a TCP connection by a three-way handshake. Also, the process 701 can include identifying 705 a timestamp policy corresponding to a target associated with the segments in the TCP connection, for example using the destination specified in the segments, as described above.

The process 701 can include identifying 707 an initial baseline timestamp as specified in the timestamp policy for the target. For example, the policy can specify that the initial baseline timestamp is the timestamp in the three-way handshake of the TCP connection, or that the initial baseline timestamp is the timestamp in packet 1 if the timestamp in the three-way handshake is zero or not used, or that the initial baseline timestamp is the timestamp in packet 1 in all cases, or that the timestamp in packet 1 is used only if packet 1 is received first, or similar. Accordingly, one or more embodiments provides that the timestamp in the next segment which is received properly according to the timestamp policy becomes the baseline timestamp; and/or that if the timestamp in the three way handshake is zero, the timestamp in the first TCP segment expected after the handshake becomes the baseline timestamp if properly received.

The process 701 can include filtering 709 segments in the TCP connection according to the timestamp policy, for example by comparing a segment's timestamp to the baseline timestamp or to an intermediate comparison timestamp. A further explanation is provided in connection with FIG. 8.

After the TCP connection is terminated in accordance with known procedures, the process 701 can include monitoring for segments 711 in the next TCP connection, likely beginning with a three-way handshake. The target in the next TCP connection can be different from the previous target. Hence, the procedure can loop to identify 705 the timestamp policy for that target, and repeat.

Accordingly, one or more embodiments provides for a method performed in an intrusion detection/prevention system for determining whether a transmission control protocol (TCP) segment in a TCP connection in a communication network is acceptable, the TCP connection including a plurality of TCP segments beginning with a three way handshake, wherein a TCP segment includes a field for a timestamp. The method includes (A) identifying a timestamp policy of plural timestamp policies, the timestamp policy corresponding to a target associated with the segments in a TCP connection; (B) identifying a baseline timestamp based on a three way handshake in the TCP connection; (C) monitoring segments in the TCP connection; and (D) filtering the segments in the TCP connection as indicated in the timestamp policy corresponding to the target, the timestamp policy indicating whether the segments are to be filtered out or forwarded to the target by comparing the timestamp of the segments to the baseline timestamp.

Referring to FIG. 8, a flow chart illustrating an exemplary procedure 801 for filtering segments in a TPC connection will be discussed and described. In overview, the procedure includes getting 803 the next segment in the TCP connection, evaluating 805 the timestamp in the segment per the timestamp policy; if the timestamp/sequence number is not valid for the target 807, then not forwarding 809 the segment to the destination host; otherwise, forwarding 811 the segment to the destination host, and updating 813 the baseline timestamp to provide an intermediate comparison timestamp per the timestamp policy; getting 815 the next segment in the TCP connection, and if not the end of the TCP connection 817, repeating. These are discussed in more detail below; however, detail is omitted if it has been previously discussed.

The procedure 801 includes getting 803 the next segment in the TCP connection. For example, the next segment can be obtained from a received packet.

The procedure 801 also includes evaluating 805 the timestamp in the segment per the timestamp policy 805. The timestamp policy has already been identified, and should correspond to the kind of host which is the target of the TCP connection. The timestamp policy will indicate how a timestamp is to be handled. For example, it may be compared to determine whether it is chronologically after the baseline timestamp. Also, the sequence number for the segment can be referenced to determine if a segment with that sequence number is expected. In addition, the timestamp policy can indicate that the timestamp is ignored for a period of time or for the entire TCP connection, for example if the timestamp is not used. The timestamp policy can also indicate how to handle a segment (e.g., keep or drop) if it is an overlapping segment. Other procedures for handling timestamps can also be accommodated in the timestamp policy.

The procedure 801 includes if the timestamp/sequence number is not valid for the target 807, then not forwarding 809 the segment to the destination host. Because segments may arrive out of order even in the usual course of communication, some or all of the segments can be buffered for reassembly. The segments can be dropped, i.e., not buffered and ignored, or alternatively, can be marked as improper or not to be forwarded. Consequently, the ID/PS will not evaluate a segment which the host system it is protecting would ignore.

On the other hand, the procedure provides for, if the timestamp/sequence number is valid according to the timestamp policy for the target, forwarding 811 the segment to the destination host. Also, if the timestamp/sequence number is valid, the procedure 801 can provide for updating 813 the baseline timestamp per the timestamp policy, for use as an intermediate comparison timestamp. For example, if segments 1 and 2 have been received and are acceptable, the intermediate comparison timestamp can be updated to segment 2, that is, the last segment in a complete sequence. In some cases the intermediate comparison timestamp can remain the same, such as where segment 3A and 3B are received, but segment 2 is delayed and not yet received.

The procedure 801 includes getting 815 the next segment in the TCP connection, and if not the end of the TCP connection 817, repeating the analysis for the next segment. If, however, this was the end of the TCP connection, the procedure 801 ends 819.

Accordingly, one or more embodiments provide that the filtering further comprises evaluating sequence numbers identified in the segments to determine whether the timestamp is valid for the target, relative to the timestamps of prior segments in the sequence.

Moreover, embodiments include a computer system configured with the foregoing computer-readable medium and/or method(s); and/or a communication network comprising at least one computer system configured with the foregoing computer-readable medium and/or method(s). Therefore, one or more embodiments provide for a computer-readable medium comprising instructions for execution by a computer, the instructions including a computer-implemented method performed in an intrusion detection/prevention system, for analyzing segments in a transmission control protocol (TCP) connection in a communication network, the TCP connection including a plurality of TCP segments beginning with a three way handshake, wherein a TCP segment includes a field for a timestamp and a field for a sequence number, the instructions for implementing: (A) monitoring a plurality of segments in a TCP connection; and (B) filtering the segments in the TCP connection as indicated in a timestamp policy corresponding to the target, the timestamp policy indicating whether the segments are to be filtered out or forwarded to the target by comparing the timestamp of the segments to the baseline timestamp and by evaluating sequence numbers identified in the segments to determine whether the timestamp is valid for the target relative to the timestamps of prior segments in the sequence according to the sequence numbers.

It should be noted that the communication networks of interest include those that transmit information in packets which can be formed into segments, for example, those known as packet switching networks that transmit data, where data can be divided into packets before transmission, the packets are transmitted, and the packets are routed over network infrastructure devices, which are sent to a destination where the segments of packets can be reassembled into the packets. Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, and other wireless application protocols or wireline application protocols and/or other protocol structures, and variants and evolutions thereof. Such networks can provide wireless communication capability and/or utilize wireline connections such as cable and/or a connector, or similar.

Furthermore, the designation "intrusion detection/prevention system" is used herein to denote a device or software that passively or actively analyzes network traffic for intrusion. Examples of such devices or software are sometimes referred to as "intrusion detection system" (IDS), "intrusion prevention system" (IPS), "network intrusion detection system" (NIDS), "network intrusion protection system" (NIPS), and the like, and variants or evolutions thereof. An intrusion detection/prevention system may be host-based, or may monitor traffic to a target system using, for example, sensors, anywhere between the target system and the intruder, typically after a final router or firewall. The designation "intrusion detection/prevention" is used herein to indicate the analysis of network traffic with respect to intrusion, where the analysis is used passively (commonly referred to as "intrusion detection") or actively (commonly referred to as "intrusion prevention"). Likewise, the designation "detect/prevent" is utilized to indicate either passive or active handling or intrusion, which may occur for example in an IDS, an IPS, or other software or device which incorporates an IDS or IPS function, such as a firewall, proxy, or the like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method performed in an intrusion detection/prevention system for determining whether a transmission control protocol (TCP) segment in a TCP connection in a communication network is acceptable, the TCP connection including a plurality of TCP segments beginning with a three way handshake, wherein a TCP segment includes a field for a timestamp, comprising:

(A) determining which timestamp policy of plural different timestamp policies corresponds to an operating system of a target receiving the segments in a TCP connection, the different time stamp policies respectively corresponding to different operating systems;

(B) identifying a baseline timestamp based on a three way handshake in the TCP connection;

(C) monitoring, in a processor disposed between an origination and a destination of the TCP connection, segments in the TCP connection; and (D) filtering the segments in the TCP connection as indicated in the timestamp policy corresponding to the operating system of the target, the timestamp policy indicating whether the processor is to filter out or forward the segments to the target based on the operating system of the target by comparing the timestamp of the segments to the baseline timestamp, the segments in the TCP connection further being filtered out and forwarded to the target differently by the different time stamp policies based on the kind of operating system, the segments in the TCP connection further being filtered out and forwarded differently to the target by the different time stamp policies for the different operating systems according to zero timestamp values on the three-way handshake; and the segments in the TCP connection further being filtered out and forwarded differently to the target by the different time stamp policies for the different operating systems according to whether the segments have no TCP timestamp option and associated values even when both hosts have negotiated the use of timestamps, wherein, if the timestamp in the three way handshake is zero, the timestamp in the first TCP segment expected after the handshake becomes the baseline timestamp if properly received.

2. The method according to claim 1, wherein the monitoring is performed in accordance with a TCP layer.

3. The method according to claim 1, wherein the segments are formatted according to a TCP layer format.

4. The method according to claim 1, wherein the filtering further comprises evaluating sequence numbers identified in the segments to determine whether the timestamp is valid for the target, relative to the timestamps of prior segments in the sequence.

5. A computer system for detecting or preventing intrusion, comprising:

(A) a unit configured to facilitate determining a kind of operating system associated with a target, in response to an indication of the target in segments in a transmission control protocol (TCP) connection; and (B) a segment filtering unit configured to facilitate determining which timestamp policy of plural different timestamp policies corresponds to the kind of operating system associated with the target of the segments in the TCP connection, the different time stamp policies respectively corresponding to different kinds of operating systems, the timestamp policy indicating whether the segments are to be filtered out or retained for the target based on the kind of operating system of the target by comparing the timestamp of the segments to a baseline timestamp, the baseline timestamp being based on a three way handshake in the TCP connection, and forwarding the segments in the TCP connection to the target if retained, the segments in the TCP connection further being filtered out and forwarded differently by the different time stamp policies based on the kind of operating system, wherein the segments in the TCP connection are filtered out and forwarded differently to the target by the different time stamp policies for the different operating systems according to zero timestamp values on the three-way handshake; and the segments in the TCP connection are filtered out and forwarded differently to the target by the different time stamp policies for the different operating systems according to whether the segments have no TCP timestamp option and associated values even when both hosts have negotiated the use of timestamps, wherein, if the timestamp in the three way handshake is zero, the timestamp in the first TCP segment expected after the handshake becomes the baseline timestamp if properly received.

6. The computer system according to claim 5, further comprising an intrusion detection/prevention unit to detect an intrusion in the segments, wherein the segment filtering unit provides the filtered segments to the intrusion detection/prevention unit.

7. The computer system according to claim 5, further comprising a receiving unit configured to facilitate receiving segments in the TCP connection, wherein the segments are received in accordance with a TCP layer.

8. The computer system according to claim 5, wherein the segment filtering unit is further configured to evaluate sequence numbers identified in the segments to determine whether the timestamp is valid for the target, relative to the timestamps of prior segments in the sequence.

9. A non-transitory computer-readable medium comprising instructions for execution by a processor, the instructions including a computer-implemented method performed in an intrusion detection/prevention system, for analyzing segments in a transmission control protocol (TCP) connection in a communication network, the TCP connection including a plurality of TCP segments beginning with a three way handshake, wherein a TCP segment includes a field for a timestamp and a field for a sequence number, the instructions for implementing:

(A) monitoring, in a processor disposed between an origination and the destination of the TCP connection, a plurality of segments in a TCP connection;

(B) identifying a kind of operating system associated with the target receiving the segments in the TCP connection, and determining which timestamp policy of plural different timestamp policies corresponds to the kind of operating system of the target, the different time stamp policies respectively corresponding to different operating systems;

(C) filtering the segments in the TCP connection as indicated in a timestamp policy corresponding to the kind of operating system target, the timestamp policy indicating whether the processor is to filter out or forward the segments to the target based on the kind of operating system of the target by comparing the timestamp of the segments to the baseline timestamp and by evaluating sequence numbers identified in the segments to determine whether the timestamp is valid for the target relative to the timestamps of prior segments in the sequence according to the sequence numbers, the segments in the TCP connection further being filtered out and forwarded differently by different time stamp policies based on the kind of operating system; and (D) setting the baseline timestamp to the timestamp in the first TCP segment expected after the handshake if properly received, if the timestamp in the three way handshake is zero, wherein the segments in the TCP connection are filtered out and forwarded differently to the target by the different time stamp policies for the different operating systems according to zero timestamp values on the three-way handshake; and the segments in the TCP connection are filtered out and forwarded differently to the target by the different time stamp policies for the different operating systems according to whether the segments have no TCP timestamp option and associated values even when both hosts have negotiated the use of timestamps.

10. The non-transitory computer-readable medium according to claim 9, further comprising instructions for setting the baseline timestamp to the timestamp in the next segment which is received properly according to the timestamp policy.

11. The non-transitory computer-readable medium according to claim 9, further comprising instructions for setting the baseline timestamp to the timestamp in the three way handshake, if the timestamp in the three way handshake is non-zero.

12. The non-transitory computer-readable medium according to claim 9, further comprising instructions for receiving the segments in the TCP connection, wherein the segments are received in accordance with a TCP layer.

* * * * *